(12) United States Patent
Fang et al.

(10) Patent No.: US 9,704,204 B2
(45) Date of Patent: Jul. 11, 2017

(54) METHODS AND SYSTEMS FOR TAGGING DATA IN A NETWORK

(71) Applicants: Grace Fang, Inglewood, CA (US); Kuo-Chun Fang, Inglewood, CA (US)

(72) Inventors: Grace Fang, Inglewood, CA (US); Kuo-Chun Fang, Inglewood, CA (US)

( * ) Notice: Subject to any disclaimer, the term of this patent is extended or adjusted under 35 U.S.C. 154(b) by 68 days.

(21) Appl. No.: 14/720,998

(22) Filed: May 26, 2015

(65) Prior Publication Data

US 2016/0210704 A1    Jul. 21, 2016

Related U.S. Application Data

(60) Provisional application No. 62/105,314, filed on Jan. 20, 2015, provisional application No. 62/111,223, filed on Feb. 3, 2015.

(51) Int. Cl.
G06K 9/00      (2006.01)
G06Q 50/00     (2012.01)
G06F 17/30     (2006.01)
G06K 9/46      (2006.01)
G06K 9/18      (2006.01)
H04L 12/58     (2006.01)
H04N 5/232     (2006.01)

(52) U.S. Cl.
CPC ....... *G06Q 50/01* (2013.01); *G06F 17/30424* (2013.01); *G06K 9/18* (2013.01); *G06K 9/46* (2013.01); *H04L 51/08* (2013.01); *H04L 51/32* (2013.01); *H04N 5/23229* (2013.01)

(58) Field of Classification Search
CPC ..... H04N 21/2541–21/44218; H04N 21/4345; H04N 21/4627; H04N 21/835; G06F 2221/0797–17/30247
USPC ........ 382/170, 171, 190, 278, 282; 709/217, 709/218, 219
See application file for complete search history.

(56) References Cited

U.S. PATENT DOCUMENTS

| | | | |
|---|---|---|---|
| 6,940,545 B1 * | 9/2005 | Ray ..................... | G06K 9/00228 348/207.99 |
| 7,274,822 B2 * | 9/2007 | Zhang ............... | G06F 17/30265 382/224 |
| 7,403,642 B2 * | 7/2008 | Zhang ............... | G06F 17/30265 382/118 |
| 7,752,466 B2 * | 7/2010 | Ginter ..................... | G06F 21/10 713/189 |
| 7,802,283 B2 * | 9/2010 | Banker ............... | G06F 17/3089 725/44 |
| 8,144,939 B2 * | 3/2012 | Thorn ................. | G06K 9/00221 382/115 |

(Continued)

*Primary Examiner* — Yosef Kassa

(57) ABSTRACT

Methods and systems for automatically tagging data are disclosed. A method includes capturing, by using an image capturing device, an image for processing. The method also includes extracting, by a data extraction device, data from the image by applying predefined rules. The method further includes determining, by a tagging device, a first identifier based on the extracted data. The method also includes associating, by a tagging device, the first identifier with the image for uniquely identifying the image. The method includes publishing, by a data publishing device, the image and the first identifier through a social media website being accessed computing device(s) based on a publishing setting defined by the user.

20 Claims, 11 Drawing Sheets

(56) References Cited

U.S. PATENT DOCUMENTS

| | | | | |
|---|---|---|---|---|
| 8,234,677 B2* | 7/2012 | Fellenstein | .......... | G11B 27/329 340/988 |
| 8,436,911 B2* | 5/2013 | Leebow | ............ | G06F 17/30265 348/222.1 |
| 8,635,674 B2* | 1/2014 | Bhatia | .................. | H04N 21/252 725/10 |
| 8,670,319 B2* | 3/2014 | Bennett | ............... | G06F 17/3089 370/232 |
| 8,682,809 B2* | 3/2014 | Avedissian | ....... | H04N 21/44016 705/1.1 |

\* cited by examiner

METHODS AND SYSTEMS FOR TAGGING DATA IN A NETWORK

TECHNICAL FIELD

The presently disclosed subject matter generally relates to techniques for automatically tagging content published in a network. Particularly, the present subject matter relates to systems and methods for tagging data, such as images, social media postings, etc., with unique identifier(s), and publishing the data along with the unique identifier(s) on various social media websites in a network.

BACKGROUND

In recent years, sharing of data by various users over the Internet® has increased tremendously. The users can share data using various Internet based platforms such as discussion forums, social media websites, such as Twitter®, LinkedIn®, Facebook®, etc., or using any other common platforms where data can be shared with users connected to the network. Since, many users share data on such common platforms, it may be desired to tag the shared data for uniquely identifying the data.

In order to tag the data with unique identifiers, a few well-known techniques such as optical character recognition (OCR) is used to extract data from the postings. Based on the extracted data, the users can select/choose the tag manually and associate the tag to the extracted data. Since, selecting/choosing the tag manually is a tedious task and is a multi-step procedure. Further, as there are numerous social media platforms available in the market, the techniques are desired that must be capable of handling tags for the data posted on various social media platforms.

SUMMARY

The present disclosure provides systems and methods for improved techniques for tagging data with unique identifiers and publishing the data and the associated unique identifiers through social media websites in a network, which overcomes the above-referenced limitations and others.

The present disclosure finds particular application in tagging content or data available on various websites, such as social media websites, with unique identifiers, such as hashtags, in a network, and will be described with particular reference thereto. However, it is to be appreciated that the present disclosure is also amenable to other like applications. For example, one might click images using an image capturing device, a smart phone etc. and tag data of the clicked images with unique identifiers (tags or hashtags) using the disclosed systems and methods.

An embodiment of the present disclosure provides a method for automatically tagging content with at least one identifier. The method may include capturing at least one image for processing based on an input from a user. In some embodiments, the user may use an image capturing device of a data tagging system for capturing or clicking the at least one image. In alternative embodiments, the image capturing device may capture the at least one image automatically without any input from the user. The method may also include extracting data from the captured at least one image by applying one or more predefined rules. In some embodiments a data extraction device of the data tagging system may extract data from the captured at least one image by applying one or more predefined rules. The method may further include determining a first identifier based on the extracted data. In some embodiments a tagging device of the data tagging system determines a first identifier based on the extracted data. The method may also include associating the first identifier with the captured at least one image for uniquely identifying the at least one image. In some embodiments, the tagging device associates the first identifier with the captured at least one image for uniquely identifying the at least one image. The method may furthermore include publishing the captured at least one image along with the first identifier through at least one social media website being accessed on at least one computing device based on a publishing setting defined by the user. In some embodiments, a data publishing device of the data tagging system publishes the captured image with the first identifier through the at least one social media website being accessed on at least one computing device based on a publishing setting defined by the user.

Another embodiment of the present disclosure provides a data tagging system for automatically tagging data with at least one identifier. The data tagging system may include an image capturing device configured to capture image(s), such as at least one image, for processing based on an input from a user. The data tagging system may also include a data extraction device configured to extract data from the captured at least one image by applying one or more predefined rules. The data tagging system may also include a tagging device configured to determine a first identifier based on the extracted data. The tagging device may also be configured to associate the first identifier with the captured at least one image for uniquely identifying the captured at least one image. The data tagging system may also include a data publishing device configured to publish the captured at least one image along with the first identifier through at least one social media website being accessed on at least one device based on a publishing setting defined by the user.

Yet another embodiment of the present disclosure provides a method for automatically tagging data on a number of social media websites in a network. The method may include retrieving at least one posting from at least one social media website. In some embodiments, a data extraction device retrieves the posting from the social media website. The method may also include applying, by the data extraction device, one or more predefined rules for extracting the data from the at least one posting, wherein an Optical Character Recognition (OCR) technique is used for extracting the data from the at least one posting. In some embodiments, Optical Pattern Recognition (OPR) technique is used for extracting the data from the at least one posting. The method may further include determining a unique identifier based on the extracted data. In some embodiments, a tagging device determines the unique identifier based on the extracted data. In alternative embodiments, the tagging device is configured to determine the unique identifier based on the extracted data and/or user input. The method may also include associating the unique identifier with the posting for uniquely identifying the posting in a network. The OCR (or OPR) technique may be used for associating the unique identifier with the extracted data. In some embodiments, the tagging device associates the unique identifier with the posting. The method may further include publishing the posting along with the unique identifier through the social media website that is being accessed on at least one device based on a publishing setting defined by a user. In some embodiments, a data publishing device publishes the posting and the associated unique identifier.

A further embodiment of the present disclosure provides a system for automatically tagging data on a number of social media websites in a network. The system may include a data tagging system including a data extraction device, a tagging device, and a data publishing device. The data extraction device may be configured to retrieve a posting from a social media website out of the social media websites for processing, and apply one or more predefined ruled for extracting the data from the posting by using an OCR (or OPR) technique. The tagging device may be configured to determine a unique identifier based on the extracted data, and associate the unique identifier with the extracted data for uniquely identifying the posting in the network by using the OCR (or OPR) technique. The data publishing device may be configured to publish the posting along with the unique identifier through the social media website that is being accessed on at least one device based on a publishing setting defined by a user.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the disclosed subject matter will be best understood by reference to the drawings, wherein like parts are designated by like numerals throughout. The following description is intended only by way of example, and simply illustrates certain selected embodiments of devices, systems, and processes that are consistent with the disclosed subject matter as claimed herein.

DETAILED DESCRIPTION

Figure 1A:
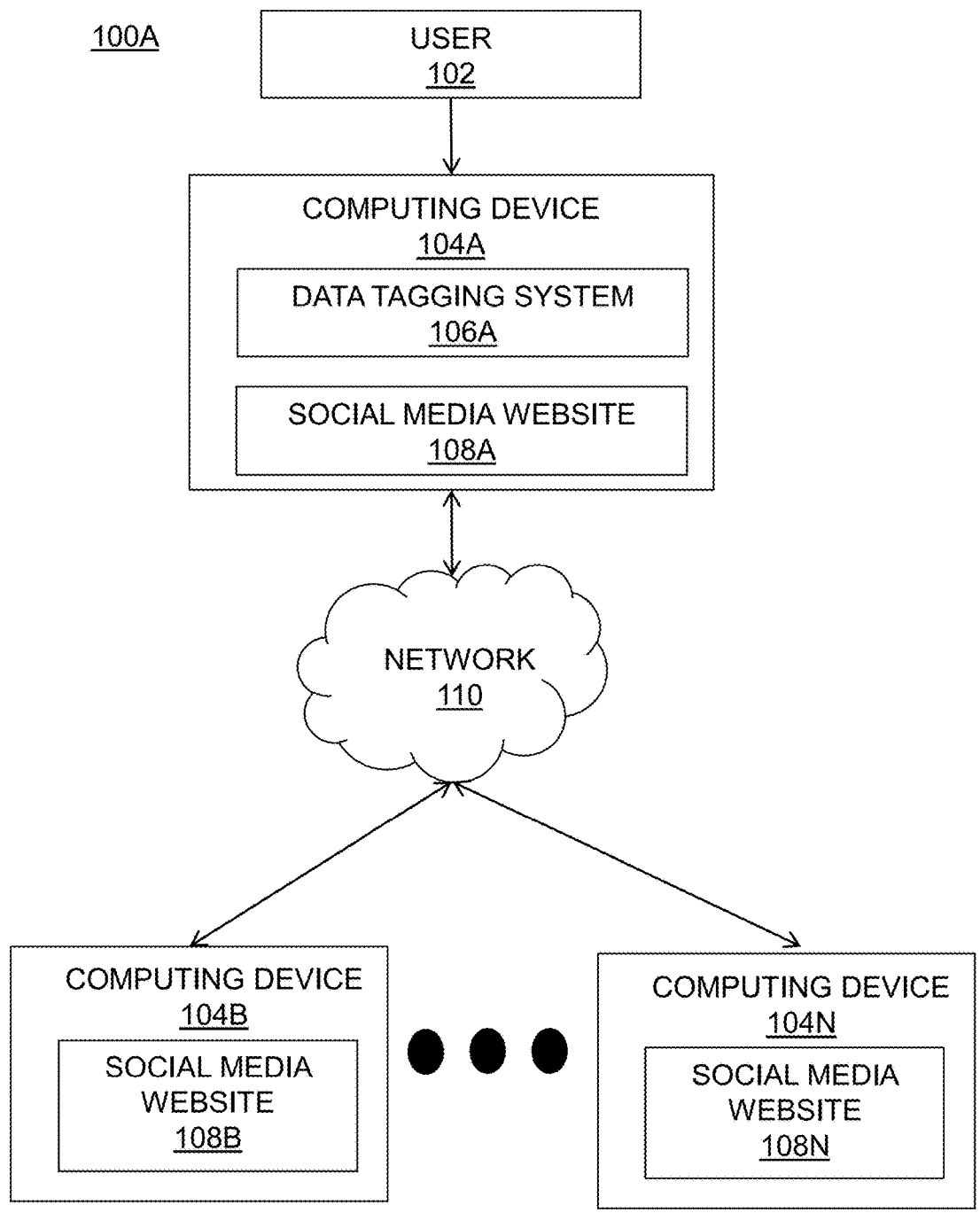
FIG. 1A is a schematic diagram illustrating an exemplary environment, where various embodiments of the present disclosure may function.

The following detailed description is made with reference to the figures. Exemplary embodiments are described to illustrate the disclosure, not to limit its scope, which is defined by the claims. Those of ordinary skill in the art will recognize a number of equivalent variations in the description that follows.

The functional units described in this specification have been labeled as devices. A device may be implemented in programmable hardware devices such as processors, digital signal processors, central processing units, field programmable gate arrays, programmable array logic, programmable logic devices, cloud processing systems, or the like. The devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executables of an identified device need not be physically located together, but may comprise disparate instructions stored in different locations which, when joined logically together, comprise the device and achieve the stated purpose of the device.

Indeed, an executable code of a device could be a single instruction, or many instructions, and may even be distributed over several different code segments, among different applications, and across several memory devices. Similarly, operational data may be identified and illustrated herein within the device, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the disclosed subject matter. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

Non-Limiting Definitions:

In various embodiments of the present disclosure, definitions of one or more terms that will be used in the document are provided below.

As used herein, a "computing device" as used herein includes a single device capable of communicating, and exchanging one or messages with other devices present in a network. The computing device is also configured to connect to the network such as the Internet.

As used herein, a "Graphical User Interface" (GUI) can include an interface on the device enabling a user to interact with the device or computing device.

As used herein, a "social media website" refers websites that may allow people to create, share or exchange information, ideas, and pictures/videos in a virtual community or virtual social network.

As used herein, a "data tagging system" can include a single device or multiple devices, such as an image capturing device, a data extraction device, a tagging device, a transceiving device, a downloading device, a data publishing device, a storage device, and combination of these, which may be configured to automatically tag content or data of various images and the content/data posted on various social media websites, and combination of any of these. The data tagging system can include hardware, software, firmware, or combination of these.

As used herein, an "image capturing device" refers to a device that can be configured to take or click images in real-time. Examples of the image capturing device may include, a camera, a video camcorder, a smart phone including an embedded camera, a web camera, and so forth.

As used herein, a "data extraction device" refers to a device including a software, hardware or combination of these, that is configured to extract data or content from the images. The image can be a captured image, pre-stored image, downloaded image, and so forth.

Further, as used herein, a "tagging device" refers to a device including hardware, software, firmware, or combination of these, that can be configured to tag the extracted data with a unique identifier for uniquely identifying the extracted content or the image in the network.

Further, as used herein, a "data publishing device" refers to a device including hardware, software, firmware, or combination of these. Further, the data publishing device can publish data or content on various social media websites in the network.

As used herein, a "downloading device" is a device configured to download data such as image etc. on a computing device. The downloading device can include hardware, software, firmware, and combination of these.

Further, as used herein, a "transceiving device" is a device configured to transmit or receive data, files, and images to and from computing device in the network. The transceiving device can include hardware, software, firmware, and combination of these.

As used herein, a "Quick Response code" or "QR code" is a machine-readable 2-dimensional code consisting of an array of black and white squares. The QR code may store embedded information.

The device or system for automatically tagging content/data with at least one identifier may be a software, hardware, firmware, or combination of these. The device or the system is further intended to include or otherwise cover all software or computer programs capable of performing the various heretofore-disclosed determinations, calculations, etc., for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs or files over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. The network may include multiple networks or sub networks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of the network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

Overview

The present disclosure provides methods and systems for automatically tagging data for publishing through various social media websites in a network. The social media websites may be accessed on various computing devices in the network. Each of the social media website may be accessed by entering a unique Uniform Resource Locator (URL) in a web browsing application such as, Google Chrome®, Internet Explorer®, and so forth on the computing device. A user can click or capture images using an image capturing device such as, a camera, an embedded camera of a smart phone, and so forth. The images may be processed further by a data tagging system. The data tagging system may extract data from a captured image by applying one or more predefined rules. The data tagging system then may determine a first identifier based on the extracted data and associate the first identifier with the captured image. The first identifier may uniquely identify the at least one image in the network. The data tagging system may be configured to publish the captured image along with the first identifier through at least one social media website that is being accessed on at least one computing device based on a publishing setting defined by the user. In some embodiments, the user may also manually tag the captured mage using a second identifier that is selected by the user.

Exemplary Embodiments

FIG. 1A is a schematic diagram illustrating an exemplary environment 100, where various embodiments of the present disclosure may function. The environment 100 may primarily include a number of computing devices 104A-104N interconnected to each other via a network 110. Each of the computing devices 104A-104N may be accessed by a user, for example, the computing device 104A may be accessed by a user 102. Examples of the computing devices 104A-104N may include, but are not limited to, laptop computers, desktop computers, smart phones, tablet computers, televisions, and so forth. Further, the computing devices 104A-104N may exchange data or information with each other via the network 110. Further, the network 110 can be a wired network, a wireless network, and combination of these.

Further, the computing device 104A may include a data tagging system 106A configured to tag data of images, postings of the social media websites etc. at the computing device 104A. Though not shown, but the person ordinarily skilled in the art will understand that other computing devices 104B-104N can also include the data tagging system 106A. The user (such as the user 102) can access at least one of a social media websites 108A-108N on their computing devices 104A-104N, respectively.

The user 102 can click or capture images using the data tagging system 106A on the computing device 104A. The data tagging system 106A may be configured to download images from one or more devices in the network 110. In some embodiments, the devices are computing devices 104B-104N, network devices, servers, and so forth. The data tagging system 106A may further be configured to save and maintain pre-stored images. The data tagging system 106A may process the images such as the captured image, pre-stored images, downloaded images, and so forth.

Further, the user 102 may post or upload data through the social media website 108A. Hereinafter, for the sake of better understanding the posted data or uploaded data on the social media website may be referred as a posting or data posting. In some embodiments, the data tagging system 106A may be configured to extract or retrieve postings (or data) from the social media websites 108A-108N and process the postings. In some embodiments, the postings on the social media websites 108A-108N can include an image, a discussion form, a textual content, a Quick Response (QR) code or the like. In some embodiments, the data tagging system 106A may include a QR code scanner (not shown) for scanning and extracting the QR code from the image (or social media posting).

Further, the data tagging system 106A may be configured to extract data from the posting(s) or the image, such as the captured image, by applying one or more predefined rules. Examples of the predefined rules may include, but are not limited to, rules for recognizing and extracting social media handlers. Examples of the handlers may include, but are not limited to, "#Hashtag", "@MyHandle", "Owner@email.com", "http://domain.com/sub", "Quick Response (QR) code", and so forth. In some embodiments, the predefined rules may be specified by the user 102 while configuring the data tagging system 106A on the computing device 104A. In some embodiments, the data tagging system 106A extracts data from the at least one image by ignoring space in between the text or spelling errors on the images or postings etc.

Furthermore, the data tagging system 106A may be configured to determine at least one identifier, such as a first identifier, based on the extracted data. The data tagging system 106A may also be configured to associate the identifier with the captured image for uniquely identifying the captured image. The data tagging system 106A may be configured to publish the image along with the identifier through at least one of the social media websites 108A-108N that are being accessed on the computing devices 104A-104N based on a publishing setting defined by the user 102. For example, the user 102 may define or select one or more of the social media websites 108A-108N on which the data and the identifier can be published.

Figure 1B:
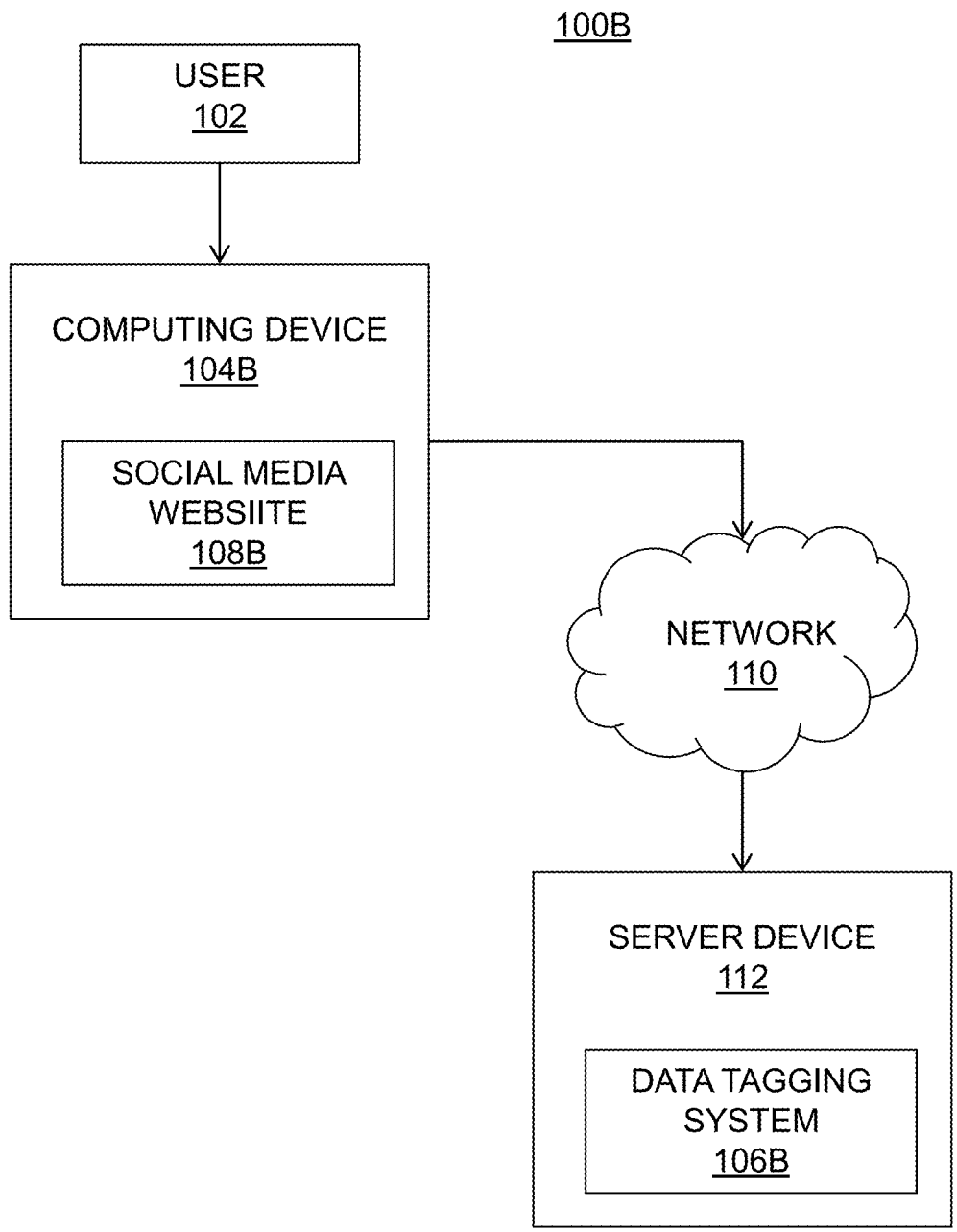
FIG. 1B is a schematic diagram illustrating another exemplary environment, where various embodiments of the present disclosure may function.

In some embodiments, the data tagging system 106A may be present on any network device present in the network 110. FIG. 1B is a schematic diagram illustrating another exemplary environment 100B, where various embodiments of the present disclosure may function. As shown, the environment 100B may include the user 102 having the associated computing device 104B including the social media website 108B. The environment 100B may also include a server device 112 including a data tagging system 106B. The computing device 104B can connect to the server device 112 via the network 110. The computing device 104B may access the data tagging system 106B via the network 110 such as the Internet®. The data tagging device 106B is similar in structure and functionality to the data tagging system 106A of FIG. 1A.

In some embodiments, the images or data (such as postings) may be received by the data tagging device 106B from the computing device 104B for processing. Due to similarity in structure and functionality, the data tagging system 106A-106B may be collectively referred as data tagging system 106.

Figure 2:
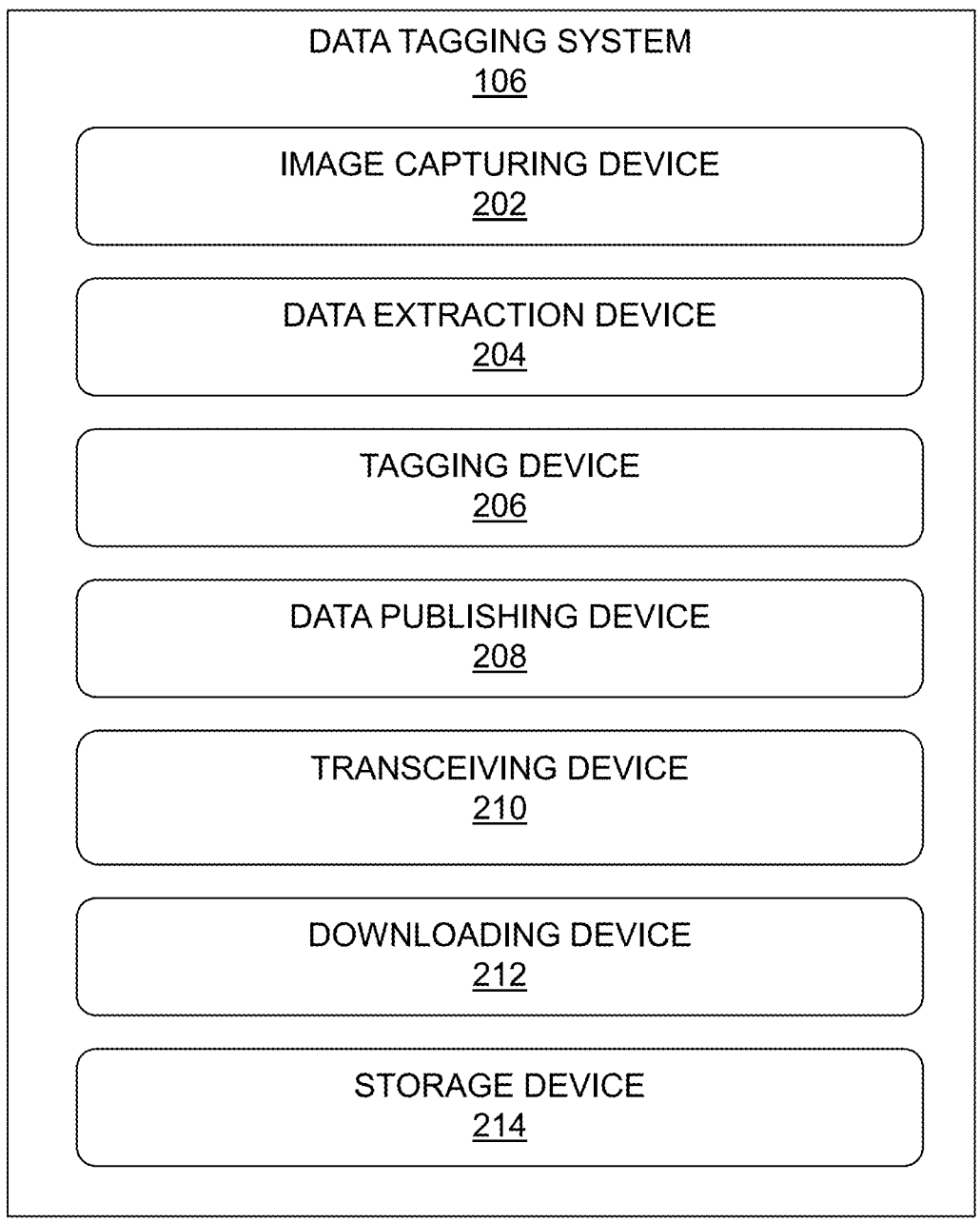
FIG. 2 is a block diagram illustrating various system elements of an exemplary data tagging system, in accordance with an embodiment of the present disclosure.

FIG. 2 is a block diagram 200 illustrating various system elements of the exemplary data tagging system 106, in accordance with an embodiment of the present disclosure. As shown, the data tagging system 106 primarily may include an image capturing device 202, a data extraction device 204, a tagging device 206, a data publishing device 208, a transceiving device 210, a downloading device 212, and a storage device 214.

As discussed with reference to FIG. 1A-1B, the data tagging system 106 may be accessed by the user 102 for automatically tagging data such as images, postings etc. with unique identifiers. The image capturing device 202 may be configured to capture/click one or more images. In some embodiments, the image capturing device 202 may capture the images based on an input from the user 102. In alternative embodiments, the image capturing device 202 may capture the images automatically without any user input. Further, the image capturing device 202 can be such as, but not limited to, a camera, a camcorder, an embedded camera of a smart phone, a webcam, and so forth. In an exemplary scenario, the user 102 can capture an image by using his/her smart phone.

The data extraction device 204 may be configured to extract data from the images by applying one or more predefined rules. The images may be captured images, images received from other devices in the network, pre-stored images, images posted on or retrieved from the social media website, downloaded images, and so forth. The data extraction device 204 may extract the data such as, numbers, alphabets, pictures, text, symbols, etc. from the images based on the predefined rules.

In some embodiments, the data extraction device 204 is configured to extract the images or data posted on the social media websites 108A-108N based on predefined rules. The data extraction device 204 may also be configured to apply the predefined rules for extracting the data from the postings, and images by using the OCR technique. In some embodiments, an Optical Pattern Recognition (OPR) technique is used by the data extraction device 204 for extracting the data from the postings and images.

The transceiving device 210 may be configured to receive the images for processing from the computing devices 104A-104N in the network 110. The downloading device 212 may be configured to download the images from the computing devices 104A-104N in the network 110 for processing. The pre-stored images are already stored at the storage device 214 of the data tagging system 106. The storage device 214 may be configured to store and maintain the images, data, user authentication information, and so forth. In some embodiments, the pre-stored images are stored at a memory of the computing device 104A and the data tagging system 106 may access the pre-stored images from the memory of the computing device 104A.

Examples of the predefined rules for extracting text from the images may include, such as, but not limited to, a rule to extract the text with no space included in between words, a rule to extract the text that is highlighted in the image, a rule to extract the text that is not preceded with a hash tag, a rule to extract the text that is preceded with a hash tag, with no spaces included between the words, and without checking the spelling, and so forth. Further examples of the predefined rules may include, such as, but not limited to, one or more predefined rules for recognizing and extracting five types of social media handlers The five types of social media handlers may include "#Hashtag", "@MyHandle", "Owner@email.com", "http://domain.com/sub", "Quick Response (QR) code", and so forth. Further, the data extraction device 204 may be configured to use an Optical Character Recognition (OCR) or OPR technique for extracting the data from the images.

The tagging device 206 may be configured to determine at least one unique identifier, such as a first identifier, based on the data extracted from the image(s) and/or the postings. The unique identifier may include at least one keyword including text, symbols, numbers, and so forth. Further, the unique identifier may uniquely identify the data or the images in the network 110. The tagging device 206 may also be configured to associate the unique identifier, i.e. the first identifier, with the images and/or the postings.

In some embodiments, the user 102 may manually select a second identifier including text, symbols, numbers, etc., based on the images, data of the images, and/or the extracted data of the postings. The tagging device 206 may also be configured to associate the second identifier and/or the first identifier with the images for uniquely identifying the images. In some embodiments, the tagging device 206 associates the unique identifier, i.e. the first and/or second identifiers, with the extracted data (or the images or the postings) using the OCR or the OPR technique.

The data publishing device 208 may be configured to publish the images (such as the captured images) and/or the postings along with the unique identifier, such as the first identifier and/or the second identifier, through at least one of the social media websites 108A-108N that may be accessed on the computing devices 104A-104N based on a publishing setting defined by the user 102. The publishing setting may include or indicate user preferences regarding the social media websites 108A-108N, regarding the computing devices 104A-104N where the user 102 may want the images and the first and/or second identifiers to be published.

Figure 3:
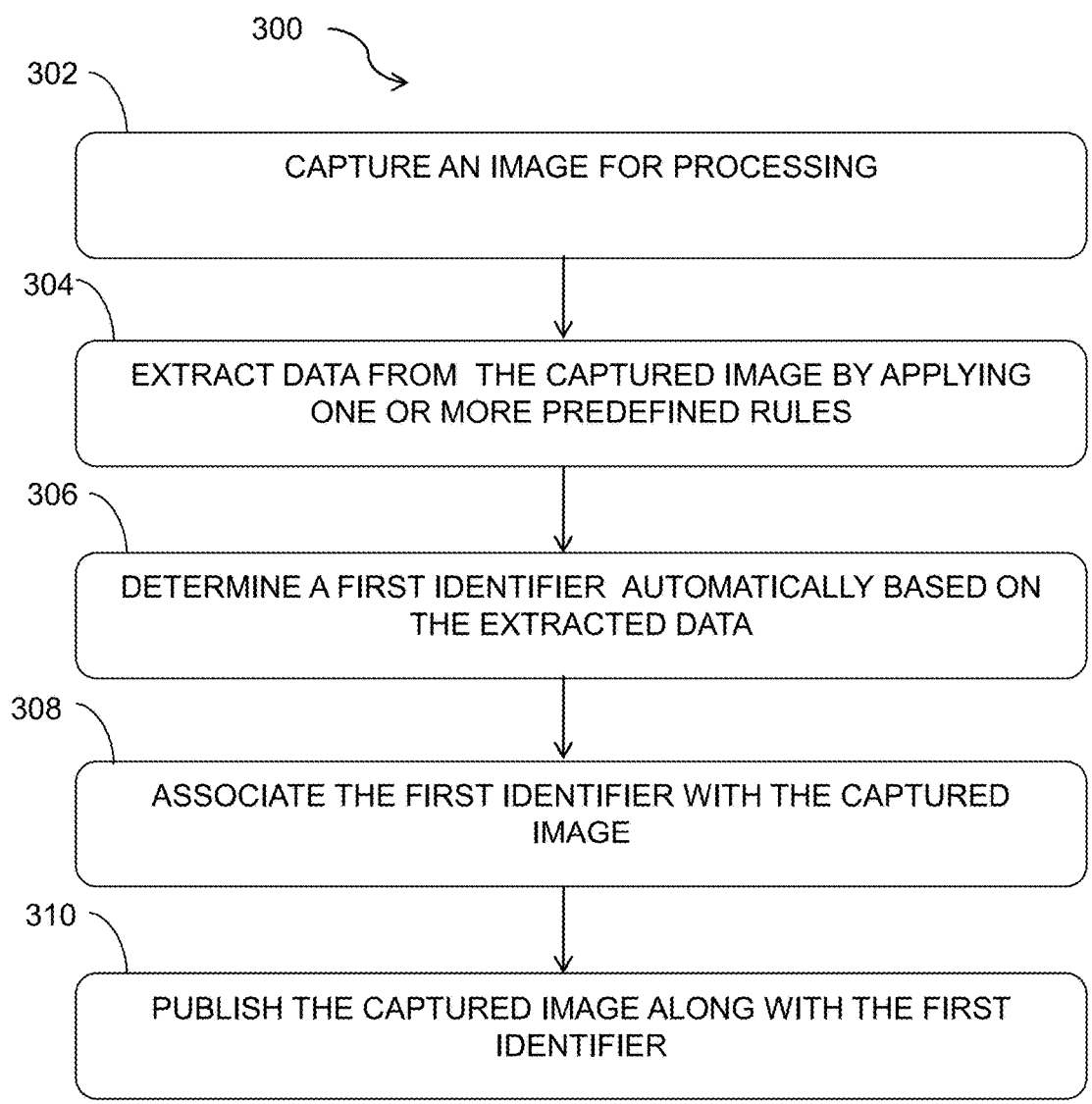
FIG. 3 is a flowchart illustrating an exemplary method for tagging data of a captured image, in accordance with an embodiment of the present disclosure.

FIG. 3 is a flowchart illustrating an exemplary method 300 for tagging of data of captured images, in accordance with an embodiment of the present disclosure. As discussed with reference to FIG. 1A, the user 102 may access the social media website 108A on the computing device 104A for tagging data, images, postings etc. through the data tagging system 106A. Further, as discussed with reference to FIG. 1B, the user 102 may access and tag the images, postings etc. through the data tagging system 106B of the server device 112. Further, as discussed with reference to FIG. 2, the data tagging system 106 includes the image capturing device 202, the data extraction device 204, the tagging device 206, the data publishing device 208, the transceiving device 210, the downloading device 212, and the storage device 214.

At step 302, an image is captured for processing based on an input from a user such as the user 102. In some embodiments, the image capturing device 202 captures the image for processing based on the input from the user 102 or automatically without any input from the user 102. At step 304, data from the captured image is extracted by applying one or more predefined rules. In some embodiments, the data extraction device 204 extracts the data from the captured image based on the predefined rules. Examples of the predefined rules may include, such as, but not limited to, one or more predefined rules for recognizing and extracting five types of social media handlers. The five types of social media handlers u include, such as, but are not limited to, "#Hashtag", "@MyHandle", "Owner@email.com", "http://domain.com/sub", and "Quick Response (QR) code". Further, the data extraction device 204 may be configured to use the Optical Character Recognition (OCR) technique or the OPR technique for extracting the data from the images. In some embodiments, the data extraction device 204 may include a QR code scanner (not shown) for scanning and extracting the QR code from the image (or social media posting).

Then at step 306, a unique identifier, such as a first identifier, is determined based on the extracted data. In some embodiments, the tagging device 206 determines the first identifier based on the extracted data. Then at step 308, the unique identifier i.e. the first identifier may be associated with the captured image. The unique identifier or the first identifier may include numerals, text, symbols, alphabets, and so forth. In some embodiments, the tagging device 206 associates the first identifier with the captured image.

Thereafter, at step 310, the captured image along with the unique identifier (i.e. the first identifier) is published through the at least one of the social media websites 108A-108N that may be accessed on the computing devices 104A-104N based on a publishing setting defined by the user 102. The publishing setting may include or indicate user preferences regarding the social media websites 108A-108N, regarding the computing devices 104A-104N where the user 102 may want the captured image and the unique identifier to be published.

Figure 4:
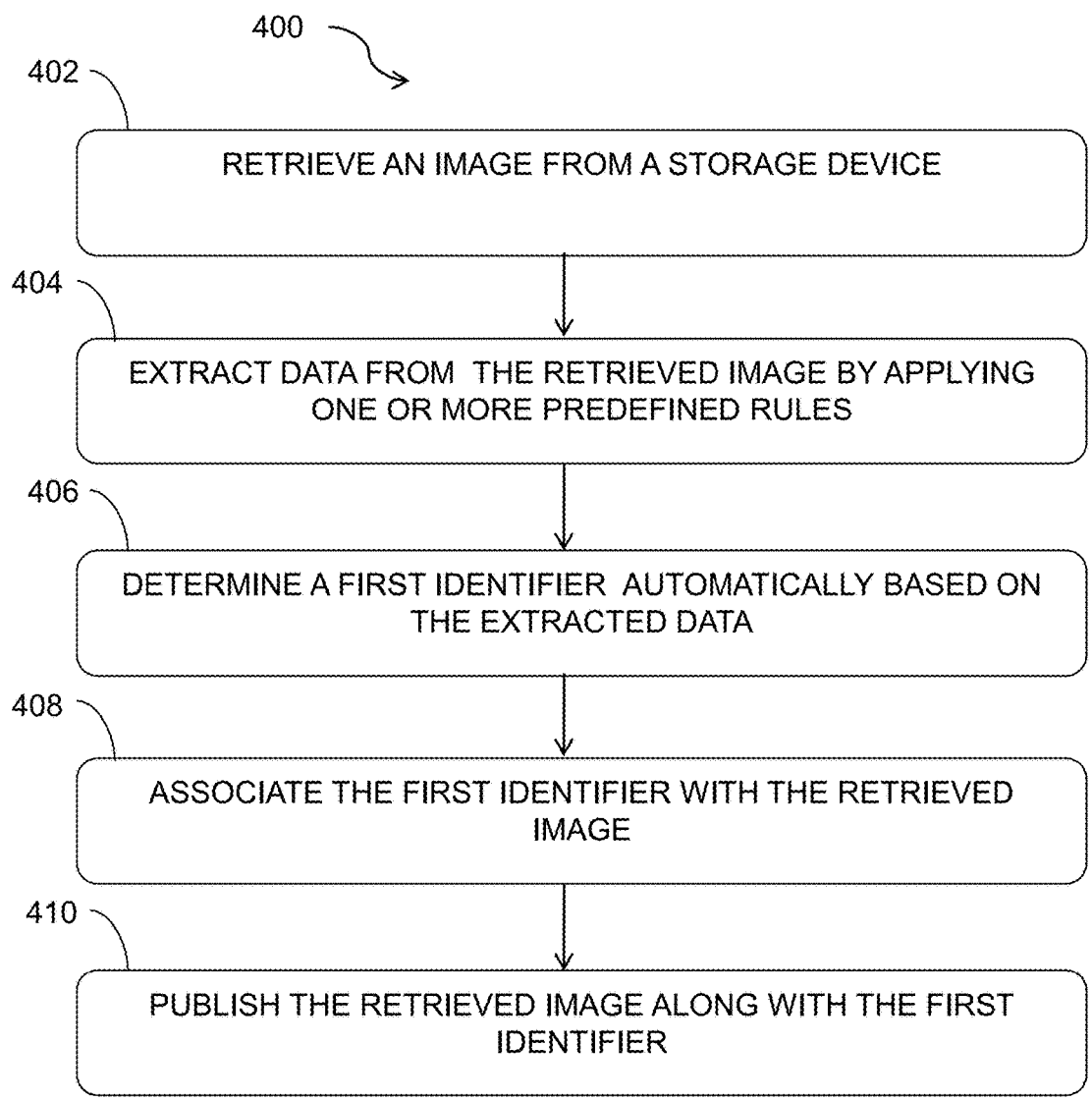
FIG. 4 is a flowchart illustrating another exemplary method for tagging data of a pre-stored image, in accordance with another embodiment of the present disclosure.

FIG. 4 is a flowchart illustrating another exemplary method 400 for tagging of data of pre-stored images, in accordance with another embodiment of the present disclosure. As discussed with reference to FIG. 2, the pre-stored images may be stored at the storage device 214 or at the computing device 104A. Further, as discussed with reference to FIG. 2, the data tagging system 106 includes the image capturing device 202, the data extraction device 204, the tagging device 206, the data publishing device 208, the transceiving device 210, the downloading device 212, and the storage device 214.

At step 402, an image is retrieved from the storage device 214 for processing. In some embodiments, the data extraction device 204 extracts the image from the storage device 214 for processing. At step 404, data from the retrieved image is extracted by applying one or more predefined rules. In some embodiments, the data extraction device 204 extracts the data from the retrieved image based on the predefined rules. Examples of the predefined rules may include, such as, but are not limited to, one or more rules for recognizing and extracting five types of social media handlers. The five types of social media handlers may include "#Hashtag", "@MyHandle", "Owner@email.com", "http://domain.com/sub", and "Quick Response (QR) code". Further, the data extraction device 204 may use the OCR technique (or OPR technique) for extracting the data from the retrieved image.

Then at step 406, a unique identifier, such as a first identifier, is determined based on the extracted data of the retrieved image. In some embodiments, the tagging device 206 determines the unique identifier (or the first identifier) based on the extracted data of the retrieved image. Then at step 408, the unique identifier, i.e. the first identifier, may be associated with the retrieved image. The unique identifier or the first identifier may include numerals, text, symbols, alphabets, and so forth. In some embodiments, the tagging device 206 associates the unique identifier with the retrieved image.

Thereafter, at step 410, the retrieved image along with the unique identifier (or the first identifier) is published through the at least one of the social media websites 108A-108N that may be accessed on the computing devices 104A-104N based on a publishing setting defined by the user 102. The publishing setting may include or indicate user preferences regarding the social media websites 108A-108N, regarding the computing devices 104A-104N where the user 102 may want the images and the unique identifier, such as the first identifier, to be published.

Figure 5:
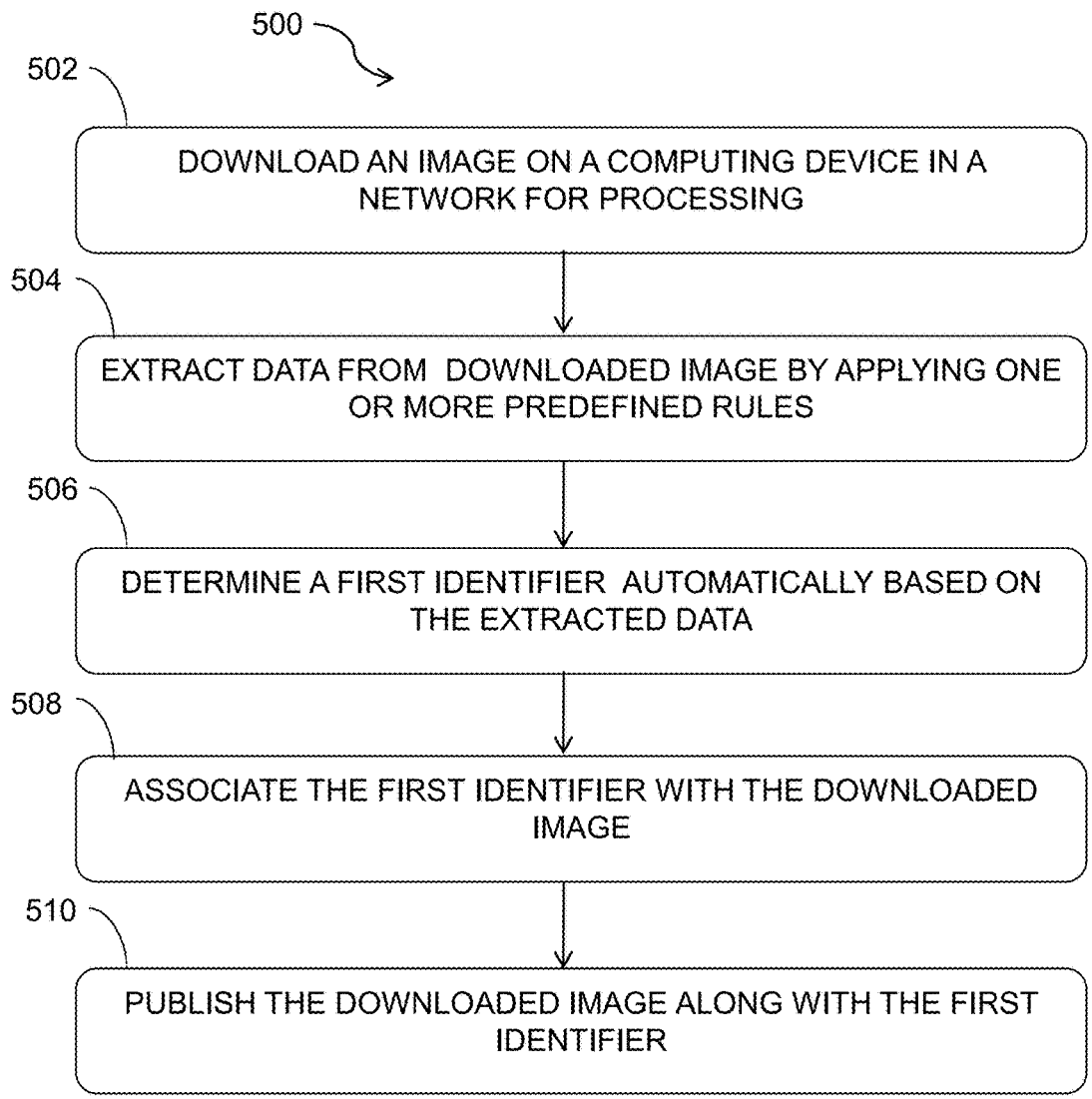
FIG. 5 is a flowchart illustrating another exemplary method for tagging data of an image received from a computing device present in a network, in accordance with another embodiment of the present disclosure.

FIG. 5 is a flowchart illustrating another exemplary method 500 for tagging of data of images received from a computing device (such as the computing device 104A) present in a network (such as the network 110), in accordance with another embodiment of the present disclosure. As discussed with reference to FIG. 1A, the computing device 104A can download images or data from any network device or other computing devices 104B-104N present in the network 110. Further, as discussed with reference to FIG. 2, the data tagging system 106 includes the image capturing device 202, the data extraction device 204, the tagging device 206, the data publishing device 208, the transceiving device 210, the downloading device 212, and the storage device 214.

At step 502, an image is downloaded from a computing device such as the computing device 104B in the network 110 for processing. In some embodiments, the image may be downloaded at the data tagging system 106A of the computing device 104A as discussed with reference to FIG. 1A. In alternative embodiments, the image is downloaded at the data tagging system 106B of the server device 112 as discussed with reference to FIG. 1B. Further, in some embodiments, the downloading device 212 downloads the image as discussed with reference to FIG. 2.

At step 504, data from the retrieved image is extracted by applying one or more predefined rules. In some embodiments, the data extraction device 204 extracts the data from the downloaded image based on the predefined rules. Examples of the predefined rules may include, such as, but not limited to, one or more rules for recognizing and extracting five types of social media handlers. The five types of social media handlers may include "#Hashtag", "@MyHandle", "Owner@email.com", "http://domain.com/sub", and "Quick Response (QR) code". Further, the data extraction device 204 may use the OCR technique (or OPR technique) for extracting the data from the downloaded image.

Then at step 506, a unique identifier, such as a first identifier, is determined based on the extracted data of the downloaded image. In some embodiments, the tagging device 206 determines the unique identifier (or the first identifier) based on the extracted data of the downloaded image. Then at step 508, the unique identifier, i.e. the first identifier, may be associated with the downloaded image. The unique identifier or the first identifier may include numerals, text, symbols, alphabets, and so forth. In some embodiments, the tagging device 206 associates the unique identifier with the downloaded image. Further, the user 102 may select a second identifier based on the downloaded image manually. The tagging device 206 may associate the second identifier with the downloaded image.

Thereafter, at step 510, the downloaded image along with the first identifier and/or second identifier is published through the at least one of the social media websites 108A-108N that may be accessed on the computing devices 104A-104N based on a publishing setting defined by the user 102. The publishing setting may include or indicate user preferences regarding the social media websites 108A-108N, regarding the computing devices 104A-104N where the user 102 may want the downloaded image(s) and the unique identifier to be published.

Figure 6:
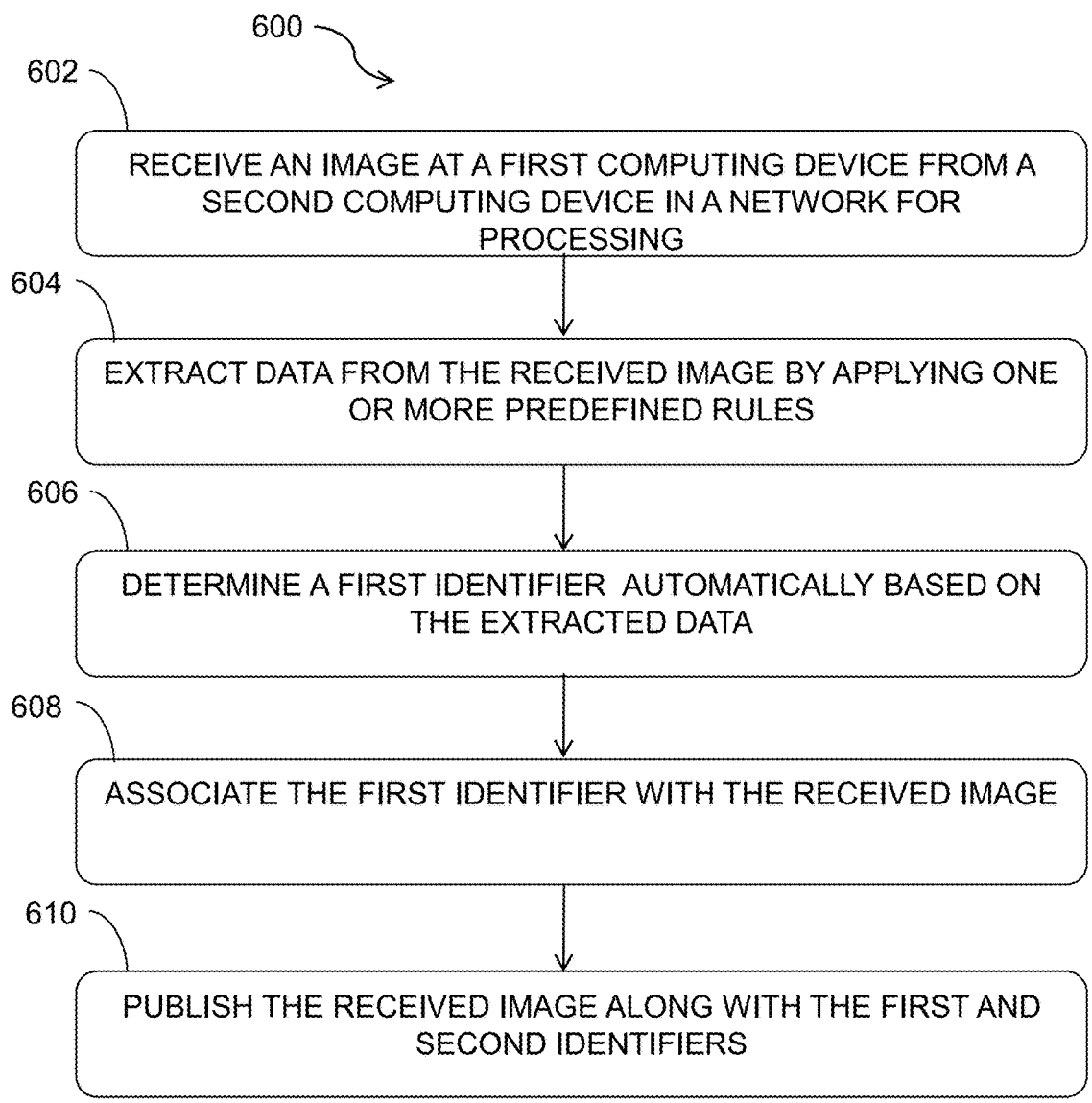
FIG. 6 is a flowchart illustrating another exemplary method for tagging data of a downloaded image, in accordance with another embodiment of the present disclosure.

FIG. 6 is a flowchart illustrating another exemplary method 600 for tagging of data of images received at a first computing device from a second computing device, in accordance with another embodiment of the present disclosure. For the sake of better understanding, the first computing device is the computing device 104A and the second computing device is the computing device 104B. As discussed with reference to FIG. 1A, the computing device 104A can receive images or data from other computing devices 104B-104N present in the network 110. Further, the computing devices 104A-104N are configured to send and receive data to each other in the network 110. Further, as discussed with reference to FIG. 2, the data tagging system 106 includes the image capturing device 202, the data extraction device 204, the tagging device 206, the data publishing device 208, the transceiving device 210, the downloading device 212, and the storage device 214.

At step 602, an image is received at the first computing device 104A from the second computing device 104B in the network 110 for processing. In some embodiments, the image may be received by the data tagging system 106A at the computing device 104A as discussed with reference to FIG. 1A. In alternative embodiments, the image may be received by the data tagging system 106B at the server device 112 from the computing device 104B as discussed with reference to FIG. 1B. Further, in some embodiments, the transceiving device 210 downloads the image as discussed with reference to FIG. 2.

At step 604, data from the received image is extracted by applying one or more predefined rules. In some embodiments, the data extraction device 204 extracts the data from the received image based on the predefined rules. Examples of the predefined rules may include, such as, but not limited to, one or more predefined rules for recognizing and extracting five types of social media handlers. The five types of social media handlers may include "#Hashtag", "@MyHandle", "Owner@email.com", "http://domain.com/sub", and "Quick Response (QR) code". The QR code may be a machine-readable 2-dimensional code consisting of an array of black and white squares. Further, the QR code may store embedded information. Further, the data extraction device 204 may use the OCR technique or the OPR technique for extracting the data from the received image. In some embodiments, the data extraction device 204 may include a QR code scanner for reading and extracting the QR code from the image (or social media posting).

Then at step 606, a unique identifier, such as a first identifier, is determined based on the extracted data of the received image. In some embodiments, the tagging device 206 determines the unique identifier (or the first identifier) based on the extracted data of the received image. Then at step 608, the unique identifier, i.e. the first identifier, may be associated with the received image. The unique identifier or the first identifier may include numerals, text, symbols, alphabets, and so forth. In some embodiments, the tagging device 206 associates the unique identifier with the received image. Further, the user 102 may manually select a second identifier based on the received image. The tagging device 206 may associate the second identifier with the received image.

Thereafter, at step 610, the received image along with the first identifier and/or second identifier is published through the at least one of the social media websites 108A-108N that may be accessed on the computing devices 104A-104N based on a publishing setting defined by the user 102. The publishing setting may include or indicate user preferences regarding the social media websites 108A-108N, regarding the computing devices 104A-104N where the user 102 may want the received image and the unique identifier to be published.

Figure 7:
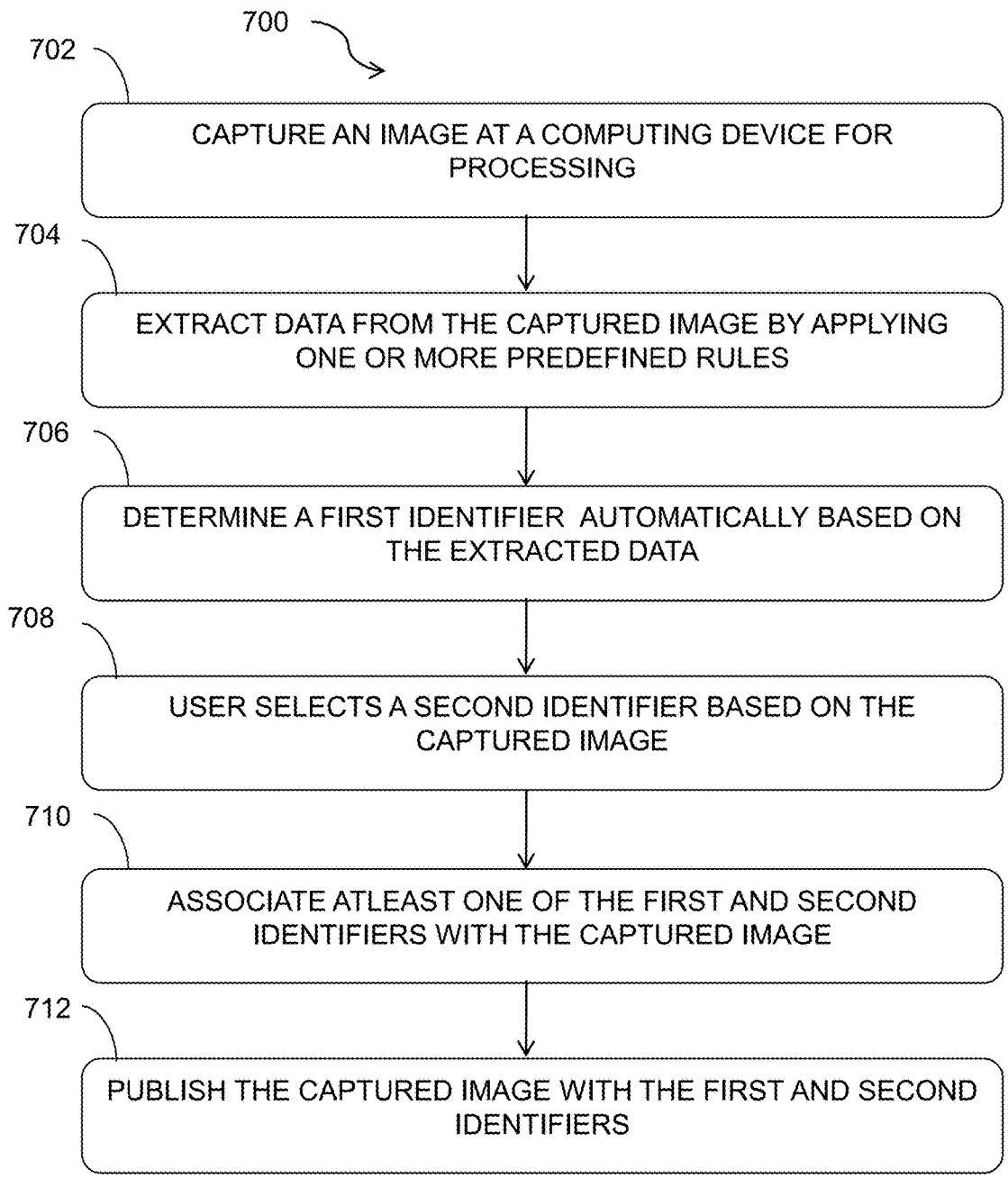
FIG. 7 is a flowchart illustrating another exemplary method for tagging data of a captured image, in accordance with another embodiment of the present disclosure.

FIG. 7 is a flowchart illustrating another exemplary method 700 for tagging of data of captured images, in accordance with another embodiment of the present disclosure. As discussed with reference to FIG. 1A, the user 102 may access the social media website 108A on the computing device 104A for tagging data, images, postings etc. through the data tagging system 106A. Further, as discussed with reference to FIG. 1B, the user 102 may access and tag the images, postings etc. through the data tagging system 106B of the server device 112. Further, as discussed with reference to FIG. 2, the data tagging system 106 includes the image capturing device 202, the data extraction device 204, the tagging device 206, the data publishing device 208, the transceiving device 210, the downloading device 212, and the storage device 214.

At step 702, an image is captured at a computing device, such as the computing device 104A, for processing. In some embodiments, the image capturing device 202 captures the image for processing based on an input from the user 102. In alternative embodiments, the image capturing device 202 at the computing device 104A automatically captures the image without any input from the user 102.

Then at step 704, data from the captured image is extracted by applying one or more predefined rules. In some embodiments, the data extraction device 204 of the data tagging system 106A (or 106) extracts the data from the captured image based on the predefined rules. Examples of the predefined rules may include, such as, but are not limited to, one or more predefined rules for recognizing and extracting at least five types of social media handlers. The five types of social media handlers may include "#Hashtag", "@MyHandle", "Owner@email.com", "http://domain.com/sub", and "Quick Response (QR) code". Further, the data extraction device 204 may be configured to use the Optical Character Recognition (OCR) or the OPR technique for extracting the data from the images.

Then at step 706, a first identifier is automatically determined based on the extracted data by the data tagging system 106A. In some embodiments, the tagging device 206 determines the first identifier automatically based on the extracted data. Thereafter, at step 708, the user 102 may manually select a second identifier based on the captured image. Each of the first identifier and the second identifier may include numerals, text, symbols, alphabets, and combination of these.

Then at step 710, at least one of the first identifier and the second identifier may be associated with the captured image. In some embodiments, the tagging device 206 associates the first identifier and/or the second identifier with the captured image.

Thereafter, at step 712, the captured image along with the first identifier and/or the second identifier may be published through the at least one of the social media websites 108A-108N that may be accessed on the computing devices 104A-104N based on a publishing setting defined by the user 102. The publishing setting may include or indicate user preferences regarding the social media websites 108A-108N, regarding the computing devices 104A-104N where the user 102 may want the captured image and the unique identifier (the first identifier and/or second identifier) to be published.

Figure 8A:
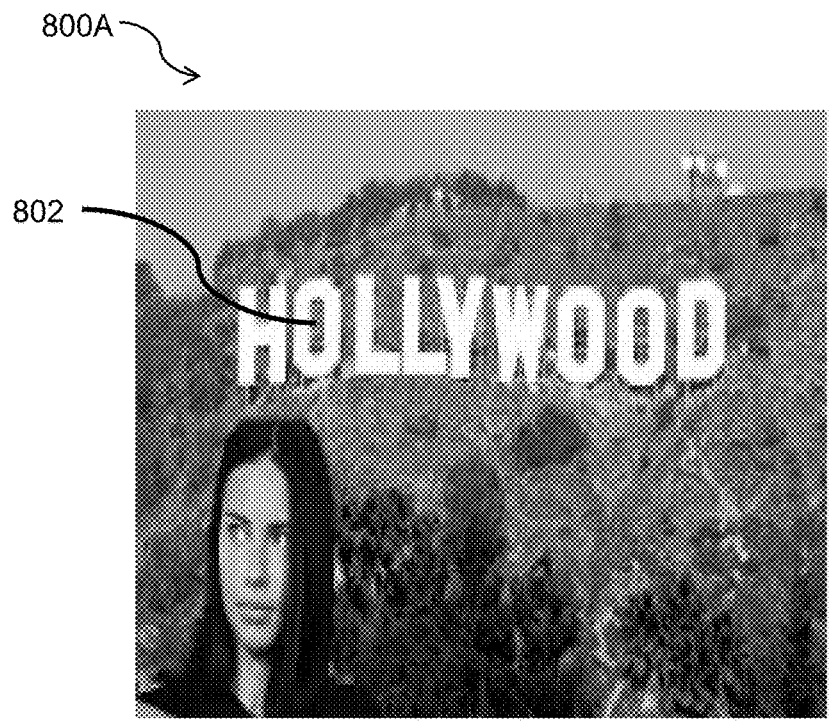
FIGS. 8A-8B shows an image before and after data tagging, respectively, in accordance with an embodiment of the present disclosure.

FIG. 8A shows an image 800A before data tagging, in accordance with an embodiment of the present disclosure. The image 800A may be a captured image, pre-stored image, a downloaded image, a received image, an image from a posting of a social media website, and so forth. As shown, the image 800A may be processed by the data tagging system 106. The image 800A may be processed at the computing device 104A including the data tagging system 106A as discussed with reference to FIG. 1A. In alternative embodiments, the image 800A may be processed at the server device 112 as discussed with reference to FIG. 1B.

Figure 8B:
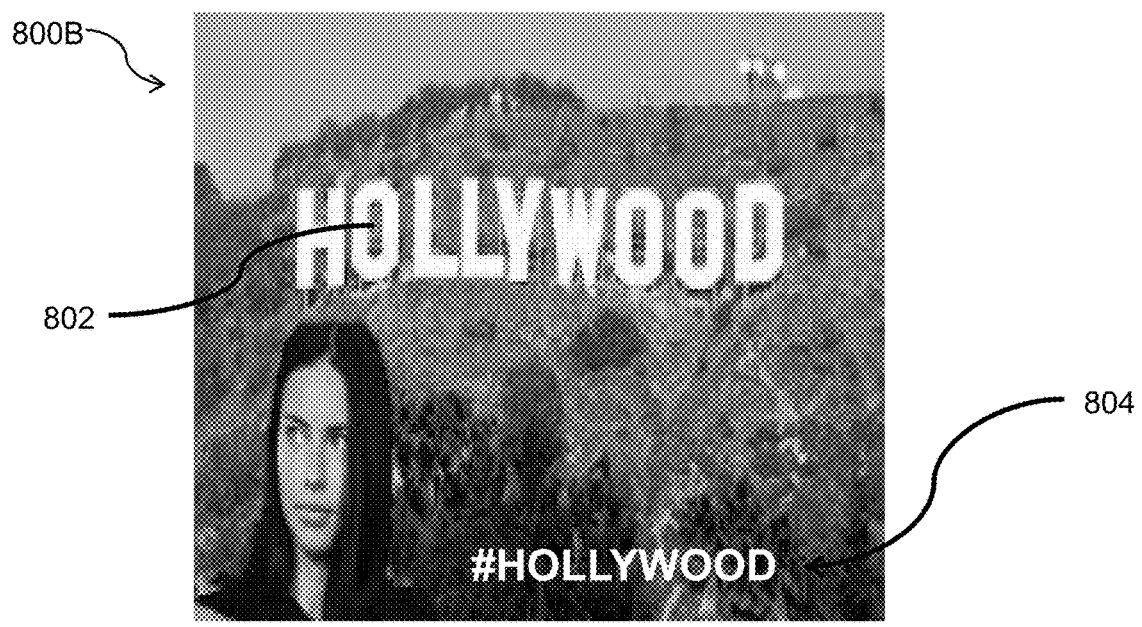

The data tagging system 106A-106B may be collectively referred as the data tagging system 106 due to similarity in their structure and functionality. The data extraction device 204 may extract the data, such as a text 802, from the FIG. 800A. The tagging system 206 may determine an identifier based on the extracted data i.e. the text 802. The data publishing device 208 may publish the image 800A along with the identifier. FIG. 8B shows an image 800B after tagging the data of the image with an identifier 804. The image 800B includes the identifier 804 i.e. "#HOLLYWOOD" for uniquely identifying the image 800B in the network 110. Though not shown, but the data may be tagged with more than one identifier as shown in FIG. 9B.

Figure 9A:
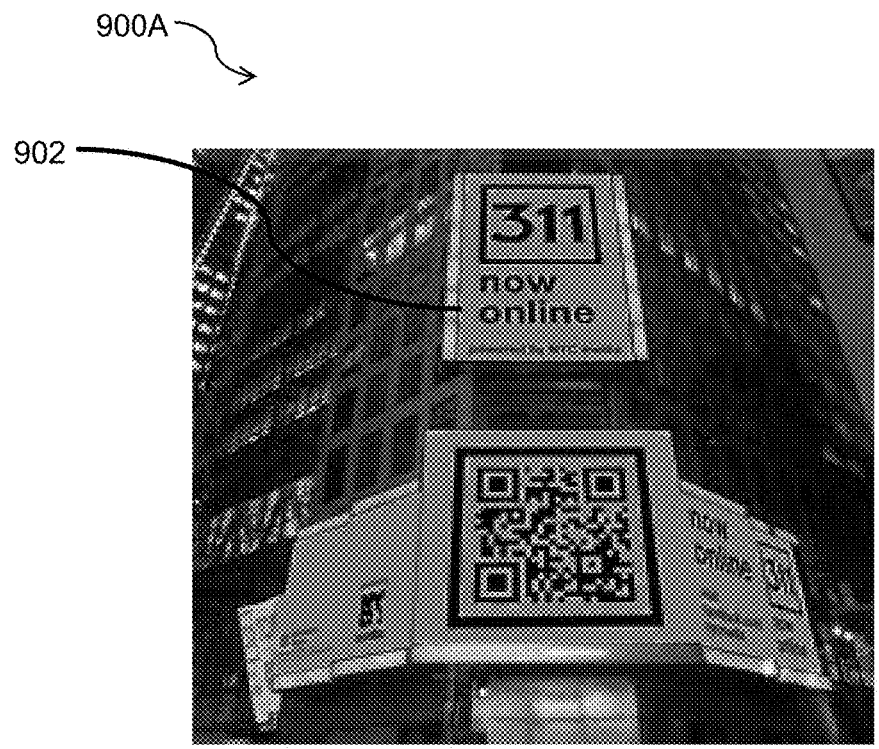
FIGS. 9A-9B shows an image including a Quick Response (QR) code before and after data tagging, in accordance with another embodiment of the present disclosure.
Figure 9B:

FIG. 9A shows an image 900A including a Quick Response (QR) code 904 before data tagging, in accordance with another embodiment of the present disclosure. The image 900A may be a captured image, pre-stored image, a downloaded image, a received image, an image from a posting of a social media website, and combination of these that includes the QR code 904. As shown, the image 900A may be processed by the data tagging system 106. The image 900A may be processed at the computing device 104A including the data tagging system 106A as discussed with reference to FIG. 1A. In alternative embodiments, the image 900A may be processed at the server device 112 as discussed with reference to FIG. 1B.

The data tagging system 106A-106B may be collectively referred as the data tagging system 106 due to similarity in their structure and functionality. The data extraction device 204 may extract the data, such as a text 902, the QR code 904, from the image 900A. The QR code 904 may be a machine-readable 2-dimensional code consisting of an array of black and white squares. Further, the QR code 904 may store embedded information. In some embodiments, the data extraction device 204 may include a QR code scanner (not shown) for scanning and extracting the QR code from the image (or social media posting). In an embodiment, the data extraction device 204 may parse the predefined rules to extract the QR code from the image (or an image posting of a social media website) by using the OCR technique or the OPR technique. In an embodiment, the data extraction device 204 parses the predefined rules to extract the text preceded with a hash tag from the image or the image postings by using the OCR technique or the OPR technique. Further, the parsed rules may not consider space in between the text or spelling errors while extracting the text from the image data.

The tagging system 206 may determine an identifier based on the extracted data i.e. the text 902 (i.e. nowonline) and the QR code 904. The data publishing device 208 may publish the image 900A along with the identifiers 906A-906B. FIG. 9B shows an image 900B after tagging the image 900A with the identifiers 906A-906B. The image 900B includes the two identifiers 906A-906B, i.e. "#311", and "#nowonline" for uniquely identifying the image 900B in the network 110.

Figure 10:
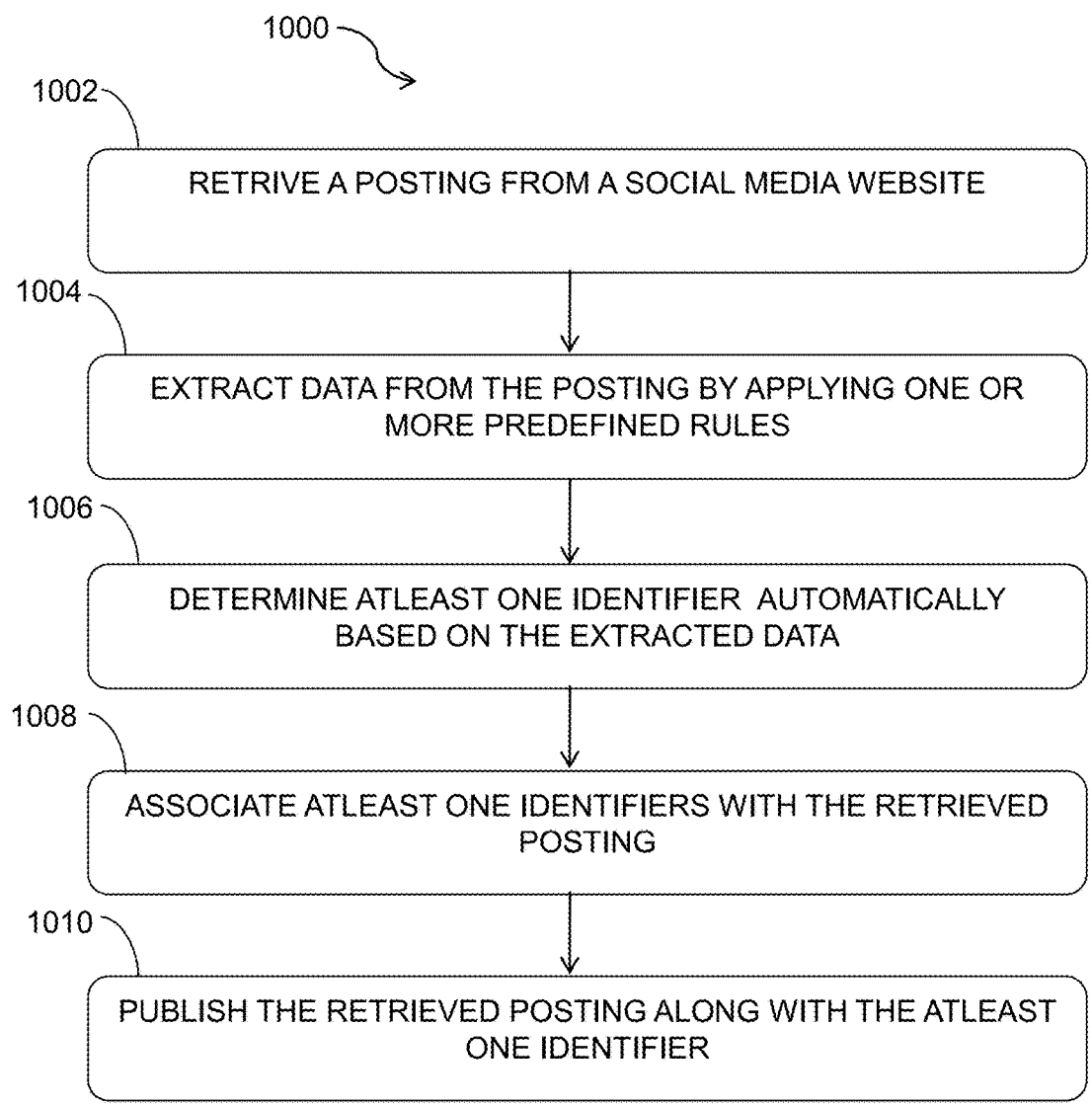
FIG. 10 is a flowchart illustrating another exemplary method for tagging data of a posting retrieved from a social media website, in accordance with an embodiment of the present disclosure.

FIG. 10 is a flowchart illustrating another exemplary method 1000 for tagging of data of postings retrieved from a social media website, in accordance with an embodiment of the present disclosure. As discussed with reference to FIG. 1A, the user 102 may access the social media website 108A on the computing device 104A for tagging data, images, postings etc. through the data tagging system 106A. Further, as discussed with reference to FIG. 1B, the user 102 may access and tag the postings of the social media website through the data tagging system 106B of the server device 112. Further, as discussed with reference to FIG. 2, the data tagging system 106 includes the image capturing device 202, the data extraction device 204, the tagging device 206, the data publishing device 208, the transceiving device 210, the downloading device 212, and the storage device 214.

At step 1002, a posting is retrieved from a social media website. In some embodiments, the data extraction device 204 retrieves the posting from the social media website. At step 1004, data from the posting is extracted by applying one or more predefined rules. In some embodiments, the data extraction device 204 extracts the data from the posting based on the predefined rules. Examples of the predefined rules may include, such as, but not limited to, one or more predefined rules for recognizing and extracting five types of social media handlers. The five types of social media handlers may include "#Hashtag", "@MyHandle", "Owner@email.com", "http://domain.com/sub", and "Quick Response (QR) code". In some embodiments, the rules may be defined and configured in the data extraction device 204 to extract the data from the posting. For example, as depicted in FIG. 8A, the data extraction device 204 may use the OCR or the OPR technique for identifying the text 802 i.e. "HOLLYWOOD" on the image data. As the text 802, i.e. "HOLLYWOOD", is recognized by the data extraction device 204 from the posting of the social media website such as, the social media website 108A. The data extraction device 204 may be configured to parse the predefined rules and use the OCR or the OPR technology to extract the text 802, i.e. "HOLLYWOOD". Further, the data extraction device 204 may be configured to use the Optical Character Recognition (OCR) or the OPR technology for extracting the data from the posting.

Then at step 1006, a unique identifier, such as a first identifier, is determined based on the extracted data. In some embodiments, the tagging device 206 determines the first identifier based on the extracted data of the posting. Further, the tagging device 206 may determine that the identifier based on the text 802, i.e. "HOLLYWOOD".

Then at step 1008, the unique identifier i.e. the first identifier may be associated with the posting. The unique identifier or the first identifier may include numerals, text, symbols, alphabets, and so forth. In some embodiments, the tagging device 206 associates the first identifier with the retrieved posting.

Thereafter, at step 1010, the retrieved posting along with the unique identifier (i.e. the first identifier) is published through the at least one of the social media websites 108A-108N that may be accessed on the computing devices 104A-104N based on a publishing setting defined by the user 102. The publishing setting may include or indicate user preferences regarding the social media websites 108A-108N, regarding the computing devices 104A-104N where the user 102 may want the retrieved posting and the unique identifier to be published.

It will be understood that the devices and the databases referred to in the previous sections are not necessarily utilized together method or system of the embodiments. Rather, these devices are merely exemplary of the various devices that may be implemented within a computing device or the server device, and can be implemented in exemplary another devices, and other devices as appropriate, that can communicate via a network to the exemplary server device.

It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

The terminology used herein is for the purpose of describing particular embodiments only and is not intended to be limiting of the disclosure. It will be appreciated that several of the above-disclosed and other features and functions, or alternatives thereof, may be combined into other systems, methods, or applications. Various presently unforeseen or unanticipated alternatives, modifications, variations, or improvements therein may subsequently be made by those skilled in the art without departing from the scope of the present disclosure as encompassed by the following claims.

What is claimed is:

1. A method for automatically tagging data with at least one identifier, comprising:
   capturing, by using an image capturing device, at least one image for processing based on an input from a user;

extracting, by a data extraction device, data from the captured at least one image by applying one or more predefined rules;

determining, by a tagging device, a first identifier based on the extracted data;

associating, by the tagging device, the first identifier with the captured at least one image for uniquely identifying the at least one image; and publishing, by a data publishing device, the captured at least one image along with the first identifier through at least one social media website being accessed on at least one computing device based on a publishing setting defined by the user.

2. The method of claim 1, wherein the at least one image comprises a pre-stored image stored in a storage device of the data tagging system, further wherein the pre-stored image is retrieved by the data extraction device for processing.

3. The method of claim 1 further comprising receiving, by a transceiving device, the at least one image for processing from a computing device in a network.

4. The method of claim 1 further comprising downloading, by a downloading device, the at least one image from a computing device in a network for processing.

5. The method of claim 1, wherein at least one of an Optical Character Recognition (OCR) technique and an Optical Pattern Recognition (OPR) is used for:

extracting, by the data extraction device, the data from the at least one image; and associating, by the tagging device, the first identifier with the extracted data.

6. The method of claim 1, wherein the one or more predefined rules comprises one or more rules for recognizing and extracting five types of social media handlers, wherein the five types of social media handlers comprises #Hashtag, @MyHandle, Owner@email.com, http://domain.com/sub, and Quick Response (QR) code.

7. The method of claim 1, wherein the data is extracted from the at least one image by ignoring space in between the text or spelling errors.

8. The method of claim 1 further comprising:

associating, by the tagging device, a second identifier with the extracted data of the at least one image, wherein the second identifier is manually selected by the user based on the at least one image; and publishing, by the data publishing device, the at least one image along with at least one of the first identifier and the second identifier through the at least one social media website being accessed on the at least one computing device based on the publishing setting defined by the user.

9. A data tagging system for automatically tagging data with at least one identifier, comprising:

an image capturing device configured to capture at least one image for processing based on an input from a user;

a data extraction device configured to extract data from the captured at least one image by applying one or more predefined rules;

a tagging device configured to:
determine a first identifier based on the extracted data; and
associate the first identifier with the captured at least one image for uniquely identifying the captured at least one image; and a data publishing device configured to publish the captured at least one image along with the first identifier through at least one social media website being accessed on at least one device based on a publishing setting defined by the user.

10. The data tagging system of claim 9, wherein the data extraction device is configured to retrieve the at least one image from a storage device of the data tagging system for processing, the at least one image comprises a pre-stored image stored in the storage device.

11. The data tagging system of claim 9 further comprising a transceiving device configured to receive the at least one image for processing from a computing device in a network.

12. The data tagging system of claim 9 further comprising a downloading device configured to download the at least one image from a computing device in a network for processing.

13. The data tagging system of claim 9, wherein:

the data extraction device uses at least one of an Optical Character Recognition (OCR) technique and an Optical Pattern Recognition (OPR) technique for extracting the data from the at least one image; and the tagging device uses at least one of the OCR technique and the OPR technique for associating the first identifier with the extracted data.

14. The data tagging system of claim 9, wherein the one or more predefined rules comprises one or more rules for recognizing and extracting five types of social media handlers, wherein the five types of social media handlers comprises #Hashtag, @MyHandle, Owner@email.com, http://domain.com/sub, and Quick Response (QR) code.

15. The data tagging system of claim 9, wherein the data extraction device is further configured to extract the data from at least one image by ignoring space in between the text or spelling errors.

16. The data tagging system of claim 9, wherein:

the tagging device is configured to associate a second identifier with the extracted data of the at least one image, wherein the second identifier is manually selected by the user based on the at least one image; and the data publishing device is configured to publish the at least one image along with at least one of the first identifier and the second identifier through the at least one social media website being accessed on the at least one device based on the publishing setting defined by the user.

17. A method for automatically tagging data on a plurality of social media website in a network, comprising:

retrieving, by a data extraction device, at least one posting from at least one social media website for processing;

applying, by the data extraction device, one or more predefined rules for extracting the data from the at least one posting, wherein at least one of an Optical Character Recognition (OCR) technique and an Optical Pattern Recognition (OPR) technique is used for extracting the data from the at least one posting;

determining, by a tagging device, a unique identifier based on the extracted data; and associating, by the tagging device, the unique identifier with the at least one posting for uniquely identifying the at least one posting in the network, wherein at least one of the OCR technique and the OPR technique is used for associating the unique identifier with the extracted data; and publishing, by a data publishing device, the at least one posting along with the unique identifier through the at least one social media website being accessed on at least one device based on a publishing setting defined by a user.

18. The method of claim 17, wherein the unique identifier comprises at least one of a first identifier and a second identifier, wherein the first identifier is determined by the tagging device automatically and the second identifier is selected by the user based on the at least one image.

19. A system for automatically tagging data on a plurality of social media website in a network, the system comprising:

a data tagging system including:

a data extraction device configured to:

retrieve at least one posting from at least one social media website for processing; and apply one or more predefined rules for extracting the data from at least one posting by using at least one of an Optical Character Recognition (OCR) technique and an Optical Pattern Recognition (OPR) technique;

a tagging device configured to:

determine a unique identifier based on the extracted data; and associate the unique identifier with the extracted data for uniquely identifying the at least one posting in the network by using at least one of the OCR technique and the OPR technique; and a data publishing device configured to publish the at least one posting along with the unique identifier through the at least one social media website being accessed on at least one device based on a publishing setting defined by a user.

20. The system of claim 19, wherein the unique identifier comprises at least one of a first identifier and a second identifier, further wherein the first identifier is determined by the tagging device automatically and the second identifier is selected by the user based on the at least one image.

* * * * *